(12) United States Patent
Griepsma et al.

(10) Patent No.: US 8,066,264 B2
(45) Date of Patent: Nov. 29, 2011

(54) CONTACT TRAY FOR A MASS TRANSFER COLUMN

(75) Inventors: Bartele Griepsma, Metttendorf (CH); Mark W. Pilling, Jenks, OK (US); Raymond Plüss, Kleinandelfingen (CH); Daniel Summers, Broken Arrow, OK (US)

(73) Assignee: Sulzer Chemtech AG, Winterthur (CH)

( * ) Notice: Subject to any disclaimer, the term of this patent is extended or adjusted under 35 U.S.C. 154(b) by 1037 days.

(21) Appl. No.: 11/986,710

(22) Filed: Nov. 26, 2007

(65) Prior Publication Data
US 2009/0134533 A1 May 28, 2009

(51) Int. Cl.
*B01F 3/04* (2006.01)
(52) U.S. Cl. ............ 261/114.4
(58) Field of Classification Search .......... 261/114.1, 261/114.4, 114.5
See application file for complete search history.

(56) References Cited

U.S. PATENT DOCUMENTS

| | | | |
|---|---|---|---|
| 3,055,646 A * | 9/1962 | Eld et al. ............ | 261/114.4 |
| 3,215,414 A * | 11/1965 | Van't Sant ........... | 261/114.4 |
| 3,770,255 A | 11/1973 | Nutter | |
| 3,940,462 A * | 2/1976 | Braun et al. ......... | 261/114.4 |
| 5,120,474 A * | 6/1992 | Binkley et al. ...... | 261/114.4 |
| 5,147,584 A * | 9/1992 | Binkley et al. ...... | 261/114.3 |
| 5,360,583 A | 11/1994 | Nutter | |
| 5,762,834 A * | 6/1998 | Hauser et al. ....... | 261/114.3 |
| 5,911,922 A * | 6/1999 | Hauser et al. ....... | 261/114.4 |
| 6,053,485 A | 4/2000 | Pan et al. | |
| 6,193,222 B1 | 2/2001 | Fan | |
| 7,540,476 B2 * | 6/2009 | Pilling et al. ........ | 261/114.4 |
| 7,540,477 B2 * | 6/2009 | Fischer et al. ....... | 261/114.4 |
| 7,624,972 B2 * | 12/2009 | Trompiz .............. | 261/114.3 |
| 2005/0280169 A1 | 12/2005 | Yao et al. | |
| 2007/0023938 A1 | 2/2007 | Fischer et al. | |
| 2008/0018003 A1 * | 1/2008 | Pilling et al. ........ | 261/114.3 |
| 2009/0115079 A1 * | 5/2009 | Trompiz .............. | 261/114.3 |

FOREIGN PATENT DOCUMENTS

| EP | 0 010 877 | 5/1980 |
|---|---|---|
| GB | 994772 | 6/1965 |

* cited by examiner

*Primary Examiner* — Charles Bushey
(74) *Attorney, Agent, or Firm* — Francis C. Hand

(57) ABSTRACT

The valve cover has a pair of tabs at the ends that are inserted into end sections of an orifice in the tray deck. The tabs of the valve cover abut against the underside of the tray deck while a pair of sloped portions of the valve cover rest on the top side of the tray deck in order to hold the valve cover in place.

21 Claims, 7 Drawing Sheets

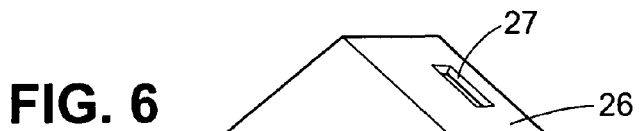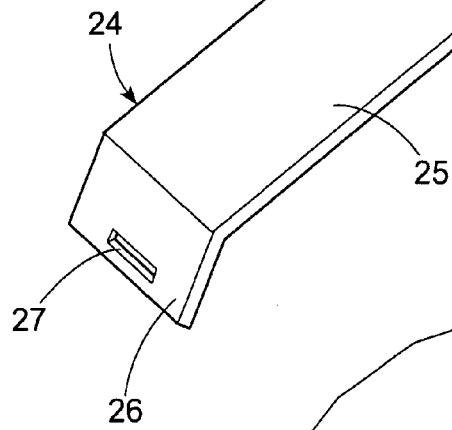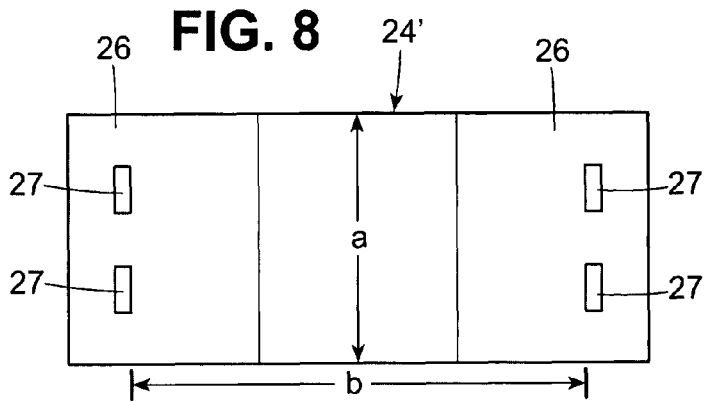

CONTACT TRAY FOR A MASS TRANSFER COLUMN

This invention relates to a contact tray for a mass transfer column.

As is known, various types of mass transfer columns have been constructed with contact trays that are arranged throughout the height of the column in spaced apart relation with orifices disposed throughout the trays. In most cases, the trays are arranged so that a downcoming liquid can be directed across each tray and from tray-to-tray in a zigzag manner over the height of the column via downcomers on one side of each tray while an ascending vapor passes through the orifices so that the liquid and vapor can enter into a mass transfer or heat transfer operation. In other cases, the trays have been made as circular dual flow trays so that vapor and liquid compete for travel through the orifices in each direction. In large columns with high liquid rates, multiple downcomers and multiple tray deck zones are used at each tray elevation. These movable valves and the adjoining tray deck are subjected to increased erosion in many applications.

In some cases, such as described in U.S. Pat. Nos. 3,463,464 and 6,588,736, fluid deflector members are located directly above each orifice in a tray deck in order to prevent the liquid from passing downwardly though the vapor-introducing orifices formed in the trays. As described, the deflector members are formed out of the trays in an integral manner. While a tray of this type is relatively strong due to the integral construction of the deflector members within the tray deck, the lift heights of the deflector members, particularly in brittle materials, has been limited. That is to say, since the formation of the deflector members requires the material to stretch to a length greater than the depth of the material, the combination of significant elongation and brittle material can cause the deflector members to crack during the forming process.

U.S. Pat. Nos. 5,911,922 and 5,762,834 describe bridge members that can be mounted across the orifices of a contact tray and that function as movable valves. These bridge members have required slots to be formed in the contact tray adjacent to an orifice in order to mount the legs of the bridge members. As a result, the bridge members have been rather cumbersome to install.

U.S. Pat. No. 5,360,583 describes fluid deflector members that are integral with a tray as well as a fluid deflector member that is movable with respect to a tray and that has outturned feet to limit upward movement relative to a deck. However, such a construction is difficult to install.

Accordingly, it is an object of the invention to provide a valve cover for a contact tray of relatively simple construction.

It is another object of the invention to provide a valve cover for a contact tray that is easy to install.

Briefly, the invention provides a contact tray for a mass transfer column that employs a tray deck for receiving a flow of liquid wherein the deck has a plurality of orifices for passage of an ascending vapor and a plurality of valve covers that are movable mounted within the orifices.

In one embodiment, each orifice is formed of a rectangular shape and each valve cover is made of sheet metal and has a central portion disposed over a central section of a respective orifice and a pair of resilient sloped portions that extend from opposite ends of the central portion and that extend through the respective orifice. In this embodiment, the valve cover may be inserted from below an orifice or from above.

In order to prevent the valve cover from falling through an orifice, the central portion of the valve cover is made wider than the orifice. In order to prevent the valve cover from being blown upwardly through an orifice, the valve cover is made longer than the orifice so that the sloped portions of the valve cover extend beyond and below the orifice.

The valve cover may also be provided with means for engaging the valve cover with the tray deck to prevent lifting of the valve cover from said tray.

In order to fix a valve cover in place within an orifice, the orifice may be formed with one or more projections on the short sides that are directed into the orifice and each of the sloped portions of the valve cover may have a corresponding number of slots or openings to receive the projections. Alternatively, one or both of the sloped portions may have a pair of spaced apart outwardly extending barbs that engage the tray from above and below via a snap-fit at the respective end of the orifice.

In still another embodiment of the invention, each orifice is formed with a central section and one or more end sections of smaller width extending from opposite ends of the central section. In this embodiment, each valve cover is made of sheet metal and has a central portion disposed over the central section of a respective orifice, a pair of resilient sloped portions that extend from opposite ends of the central portion and one or more tabs corresponding to the number of end sections. Each tab extends from a sloped portion through a respective end section of the orifice and under the tray. In this embodiment, the sloped portions are of a width greater than the end sections so as to abut and rest on the tray when the valve cover is put in place in order to prevent the valve cover from falling through the tray. The tabs extend below the tray and beyond the width of the orifice to prevent the valve cover from lifting out of the tray.

In this latter embodiment, one or more tabs of a valve cover may be provided with an outwardly extending barb for engaging under the tray when in place to prevent the valve cover from lifting out of the tray.

In order to install the valve cover in an orifice of the tray deck, the two sloped portions of the valve cover are flexed inwardly so that the two tabs of the valve cover can pass through the end sections of the orifice. Thereafter, the sloped portions are allowed to flex back to the original shape so that the valve cover is held in place by the tabs relative to the orifice. In this respect, the sloped portions of the valve cover rest on one side of the tray deck while the tabs of the valve cover engage against an underside of the tray deck adjacent to the ends of the orifice.

Alternatively, the valve cover may be inserted into an orifice of a tray deck by first inserting one tab into an end section of an orifice and then flexing the opposite tab inwardly to pass through the opposite end section of the orifice and into place.

The valve cover may also be inserted into an orifice of a tray deck from below by threading the valve cover upwardly through the orifice and then inserting the tabs into the end sections of the orifice.

Further, the central section of each said valve cover may be made of smaller width than the central section of a respective orifice for upward passage through the orifice without having to thread the valve cover through the orifice. In this case, the sloped portions would be flexed inwardly to allow the valve cover to move upwardly through the orifice until the sloped portions clear the orifice. Upon release of the sloped portions, the tabs would move into the end sections of the orifice.

In still another embodiment, the orifice may be of rectangular shape and the valve cover has a central portion disposed over a central section of the orifice, a pair of resilient sloped portions that extend from opposite ends of the central portion and are wider than the orifice to abut the tray and a pair of tabs, each of which extends from a sloped portion perpendicularly of the tray. In order to prevent the valve cover from being blown upwardly through an orifice, one or both tabs is provided with an outwardly extending barb for engaging under the tray when in place.

In still another embodiment, the orifice may be of rectangular shape and the valve cover may be made of the same width as the orifice but of a greater length. In this embodiment, the valve cover has a central portion disposed over a central section of the orifice and a pair of resilient sloped portions that extend from opposite ends of the central portion through the orifice and beyond. The sloped portions serve to prevent the valve cover from lifting out of the orifice. In order to prevent the valve cover from falling through an orifice, one or both sloped portions has one or more integral tabs formed in the end thereof that bends outwardly to engage the top of a tray.

The valve cover may be made of any suitable material and thickness. For example, the valve cover may have a thickness of from 1.5 mm to 3.5 mm.

In one embodiment, the central section of each orifice is of trapezoidal shape with the wider end on the upstream side relative to the flow of liquid across the tray. In this embodiment, the central portion of each valve cover is of a complementary trapezoidal shape. Further, the central portion and sloped portions of a valve cover may be of greater width than the central section of an orifice.

These and other objects and advantages of the invention will become more apparent from the following detail and description, taken in conjunction with the accompanying drawings wherein.

Figure 5:
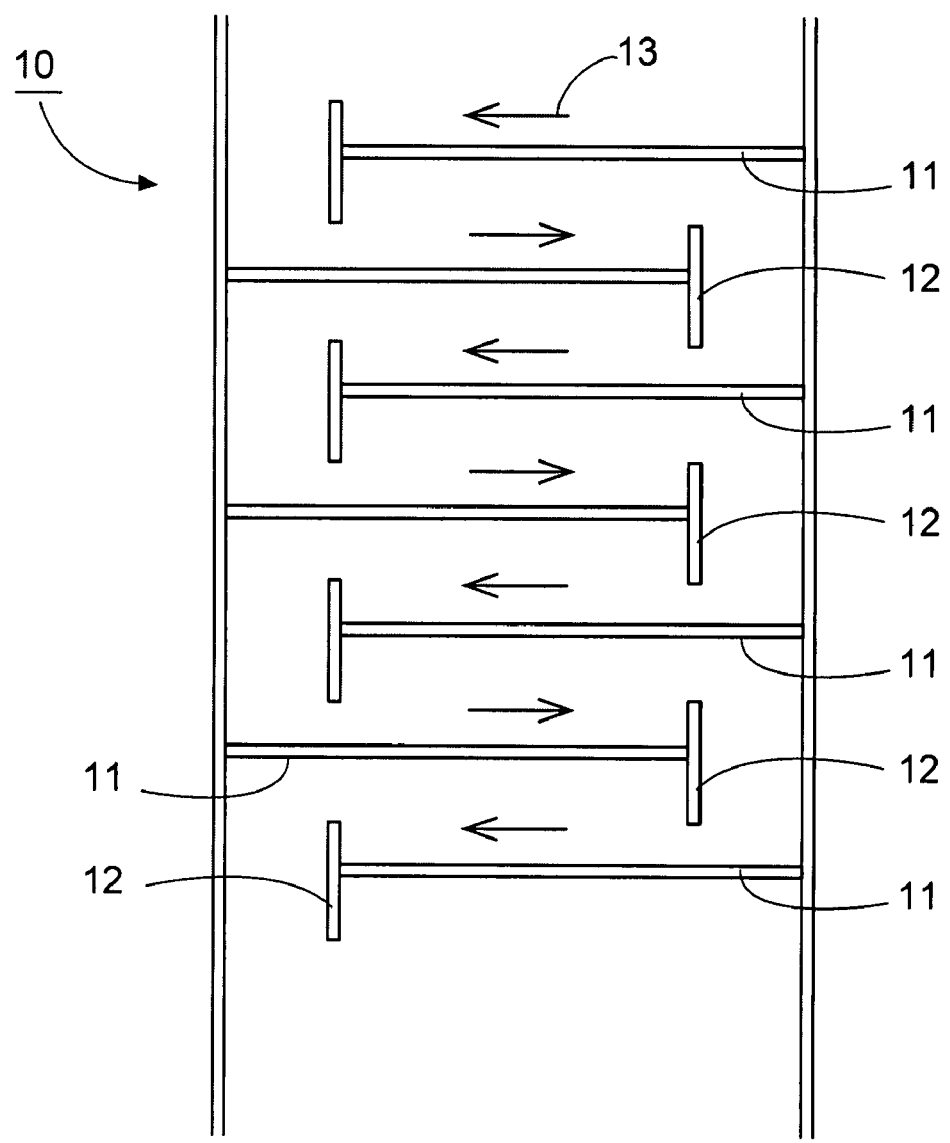
Figure 9:
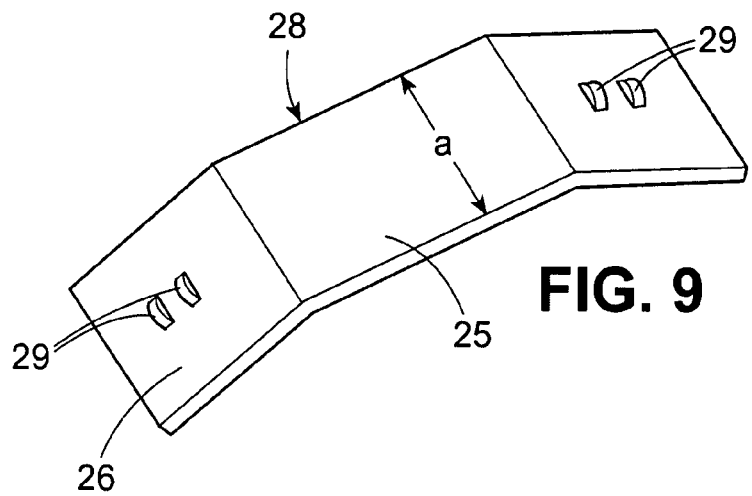
Figure 10:
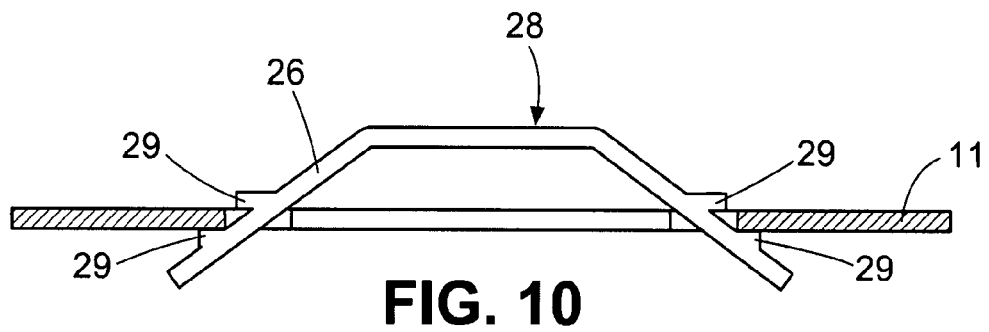
Figure 11:
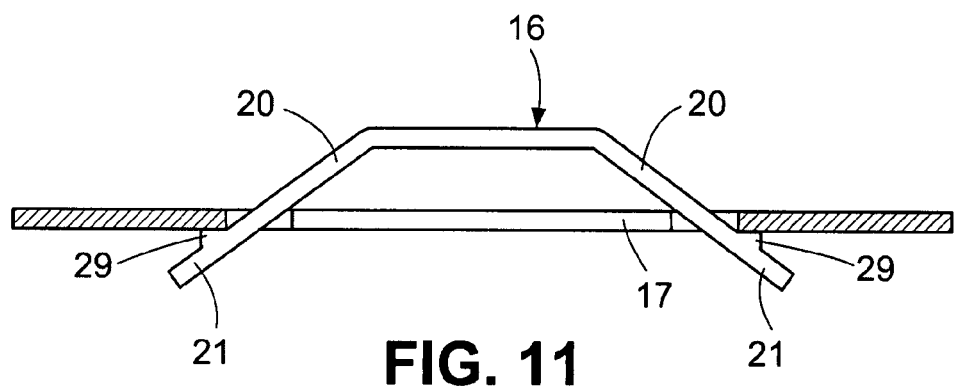
Figure 12:
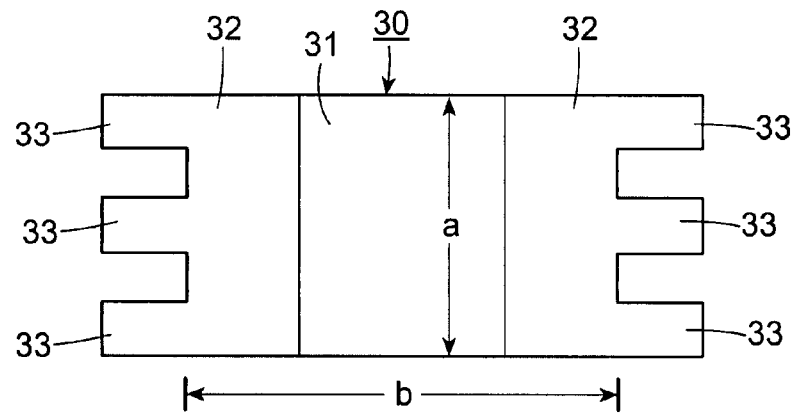
Figure 13:
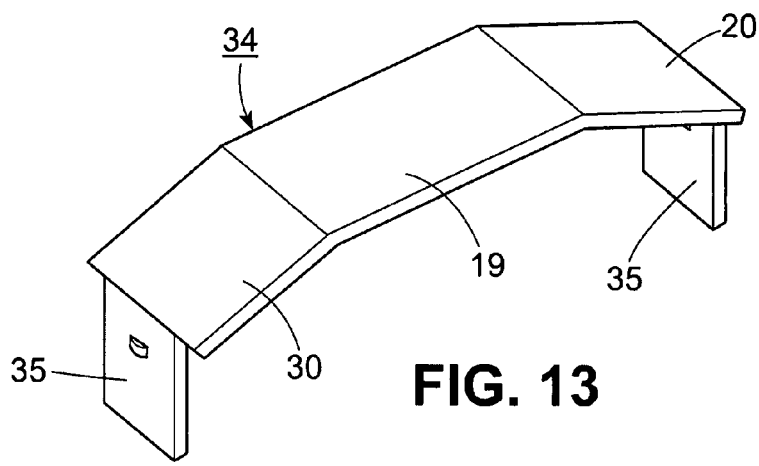
Figure 14:
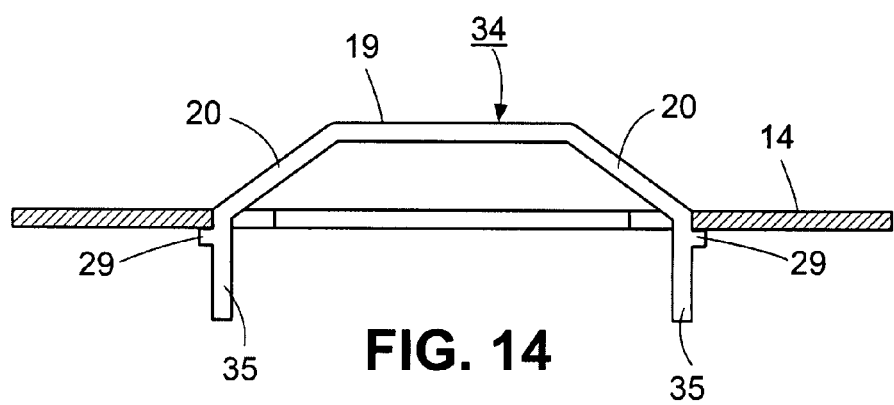
Figure 15:
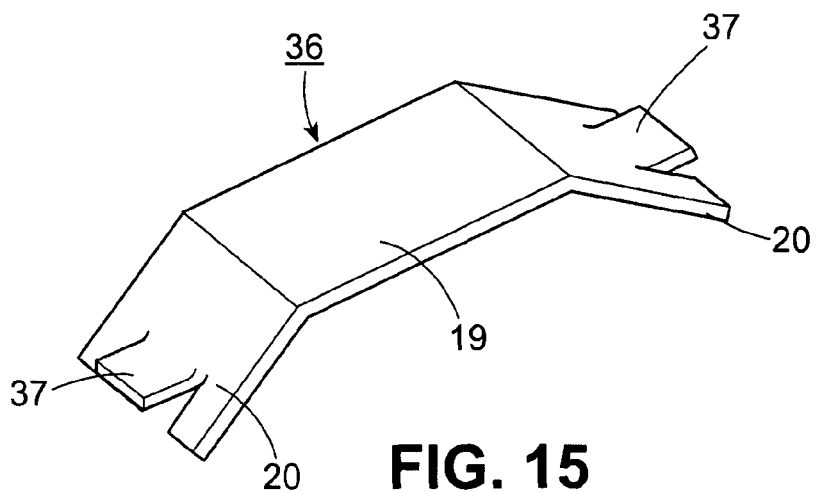
Figure 16:
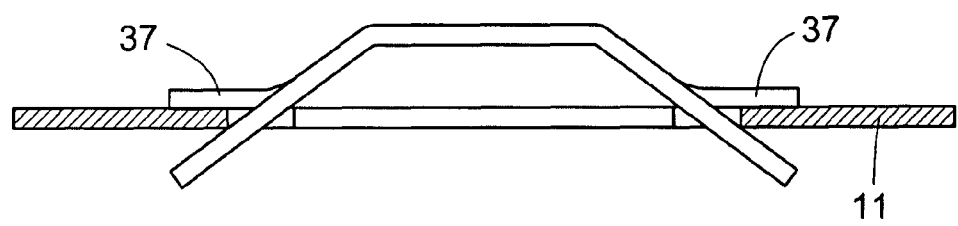

FIG. 5 schematically illustrates a side view of a tower employing a plurality of contact trays in accordance in with the invention;

FIG. 6 illustrates a perspective view of a modified valve cover having slots in accordance with the invention;

FIG. 7 illustrates a section of a tray with an orifice to receive the valve cover of FIG. 6;

FIG. 8 illustrates a top view of a valve cover similar to that of FIG. 6;

FIG. 9 illustrates a perspective view of a modified valve cover having pairs of barbs in accordance with the invention;

FIG. 10 illustrates a side view of the valve cover of FIG. 9 mounted in a tray;

FIG. 11 illustrates a side view of a modified valve cover similar to FIG. 9 with a barb mounted in a tray;

FIG. 12 illustrates a top view of a modified valve cover having a plurality of end sections in accordance with the invention;

FIG. 13 illustrates a perspective view of a modified valve cover having perpendicular end sections in accordance with the invention;

FIG. 14 illustrates a side view of the valve cover of FIG. 13 mounted in a tray;

FIG. 15 illustrates a perspective view of a modified valve cover having a bent integral tab in accordance with the invention; and FIG. 16 illustrates a side view of the valve cover of FIG. 15 mounted in a tray.

Referring to FIG. 5, the tower 10 is disposed on a vertical axis and is constructed in a conventional manner. As indicated, the tower 10 contains a plurality of horizontally disposed contact trays 11 that are disposed over the height of the column 10 in spaced vertical relation to each other and a plurality of downcomers 12. The downcomers 12 are constructed in a conventional fashion to communicate one side of a respective contact tray 11 with an opposite side of the contact tray 11 immediately below in order to direct a flow of liquid 13 horizontally across the respective contact trays in a zigzag manner. In some cases, there may be more than one downcomer per tray 11.

Each contact tray 11 has a tray deck 14 that has a plurality of orifices 15 for passage of an ascending vapor therethrough for mass transfer or heat transfer with the liquid as well as a plurality of valve covers 16 for preventing the liquid from passing through the orifices 15 and to direct the flow of vapor laterally of the orifices 15.

Figure 1:
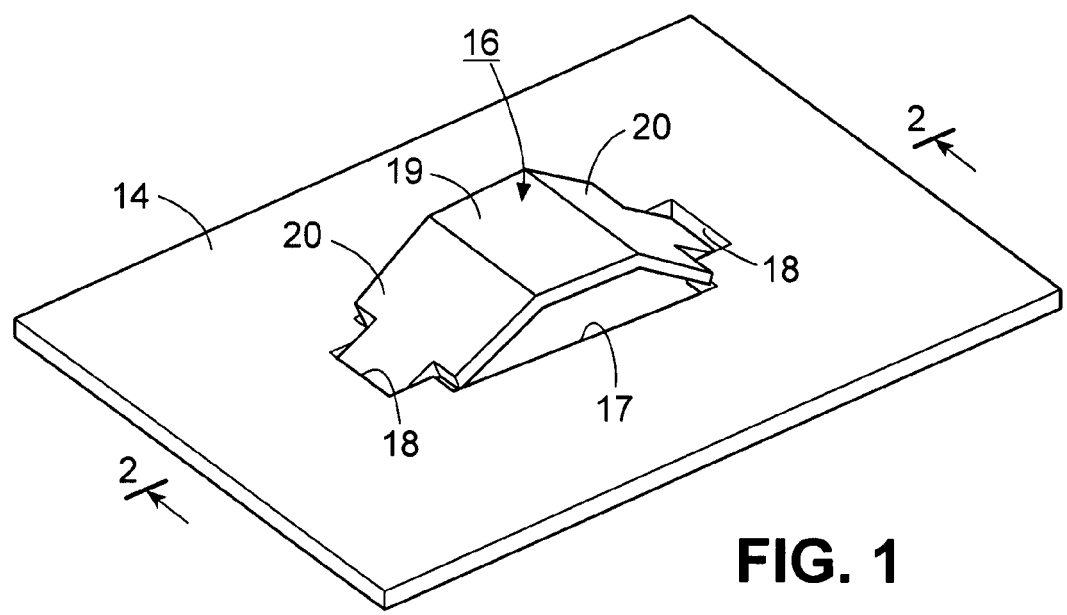
FIG. 1 illustrates a perspective view of a section of a tray deck with a valve cover in accordance with the invention.
Figure 4:
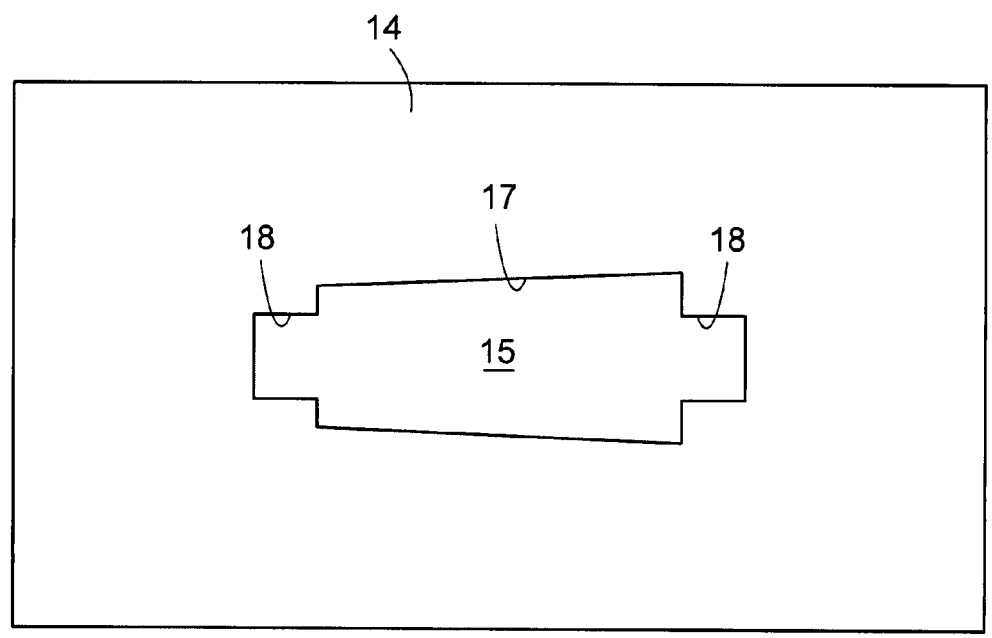
FIG. 4 illustrates a plan view of a section of the tray deck of FIG. 1 without the valve cover in place.

Referring to FIGS. 1 and 4, wherein like reference characters indicate like parts as above, each orifice 15 in a tray deck 14 has a central section 17 and a pair of rectangular end sections 18 of smaller width that extend from opposite ends of the central section 17. The central section 17 may be made of any suitable shape, such as round, rectangular, diamond shape, or otherwise in an effort to enhance the operating properties, installation ease, or production cost. As illustrated, the central section 17 is preferably of trapezoidal shape with the larger end on the upstream side relative to a flow of liquid 13 passing over the tray deck, for example, from right to left, as viewed. The end sections 18 are made in whatever shape is most economic and functional.

Figure 2:
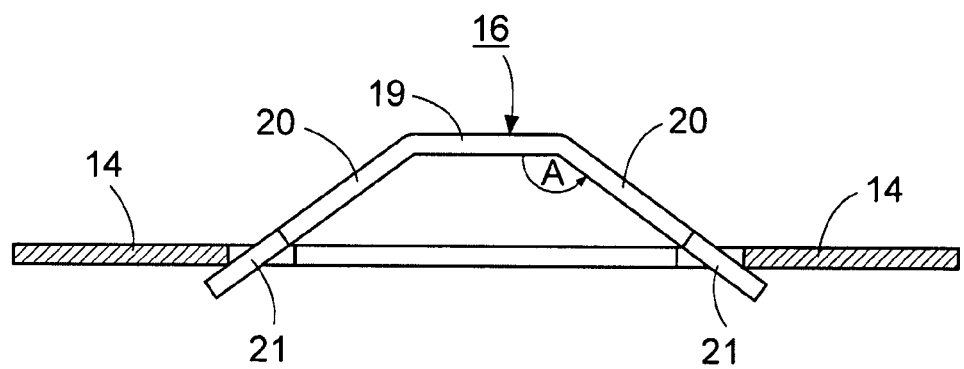
FIG. 2 illustrates a view taken on line 2-2 of FIG. 1.
Figure 3:
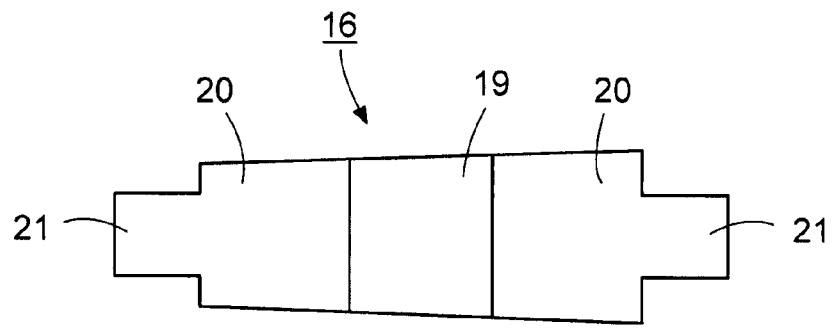
FIG. 3 illustrates a plan view of the valve cover of FIG. 1.

Referring to FIGS. 2 and 3, wherein like reference characters indicate like parts as above, each valve cover 16 has a central portion 19 disposed in spaced parallel relation to the tray deck 14 and over the central section 17 of a respective orifice 15. In addition, each valve cover 16 has a pair of sloped portions 20 that extend laterally outwardly from opposite ends of the central portion 17 and that rest on the tray deck 14. (See FIG. 2) In this respect, the sloped portions 20 are of a greater width than the width of the rectangular section 18 of the orifice 15.

Each valve cover 16 also has a pair of tabs 21, each of which extends from a respective sloped portion 20 in coplanar relation through a respective rectangular end section 18 of the orifice 15 and under the tray deck 14. (See FIG. 2). Each tab 21 is of a rectangular shape with a width to pass through the rectangular section 18 of the orifice 15 and of a length to engage the underside of the tray deck 14 when in place.

Alternatively, each tab 21 may be of another shape suitable to retain the valve cover 16 from rising out of the opening 15 in the tray deck 14 when in use. As such, the tabs 21 act as a means to prevent lifting of the valve cover 16 from the tray deck 14.

Likewise, a plurality of tabs of less width may be used on each sloped portion 20 instead of one wide tab. For example, two tabs may extend from a sloped portion 20, one at each corner.

The tabs 21 of the valve cover 16 may be made with different shapes and widths and, likewise, the rectangular sections 18 of the orifice 15 in order to prevent the valve cover 16 from being installed in an incorrect orientation.

Alternatively, the central section 17 may be out of parallel with the tray deck 14 so that the valve cover 16 may be used as a pushing valve.

Also, instead of the valve cover 16 being of multi-chordal shape as viewed in FIG. 1, the valve cover may be arc shaped with no bends but one continuous arc. In this latter embodiment, the arc shaped valve cover has a central arcuate portion disposed in spaced relation to the tray deck and over an orifice, a pair of resilient sloped portions of curved shape extending from opposite ends of the central portion to seat on the tray deck and tabs of smaller width than the sloped portions that extend from the sloped portions to extend through the orifice.

The central portion 19 of the valve cover 16 may be made of a greater width than the central section 17 of the orifice 15 throughout the length of the central portion 19 and sloped portions 20 of the valve cover 16.

As indicated in FIG. 2, the sloped portions 20 of the valve cover 16 form an obtuse angle A with the central portion. When the angle A is close to 90°, each tab may be of a T-shape wherein the stem of the tab extends from and is narrower than a sloped portion 20 and the cross-bar of the tab is of a width equal to or wider than the sloped portion 20. Where the cross-bars of the tabs 21 are made with a greater width than the sloped portions 20 and the rectangular sections 18 of the orifice, these cross-bars abut the underside of the tray deck 14 to thereby prevent the valve cover 16 from lifting out of the orifice 15 of the tray deck 14.

The valve cover 16 is made of any suitable material, such as sheet metal, and is of a suitable thickness, for example being of from 10 to 16 gauge, that is from 1.5 mm to 3.5 mm in thickness. This allows the valve cover 16 to be readily flexed when being installed.

By way of example, the tray deck 14 has a thickness of 3.5 mm. Preferably, the tray deck is made of 12 gauge and 14 gauge material, i.e. a thickness of 1.9 and 3.4 mm. Hence, for tray decks of a thickness of from 1.5 to 3.5 mm, the valve cover 16 has a corresponding thickness of from 1.5 to 3.5 mm. In this respect, the valve cover 16 could be thinner than the tray deck 14. Typically, the cover thickness should only be strong enough to deal with the uplift force and corrosion limitations.

The rectangular section 18 of the orifice 15 has a width of 15.5 mm while each tab 21 of the valve cover 16 has a width of 15 mm. Accordingly, there is a slight clearance for the tab 21 of the valve cover 16 to pass through the rectangular section 18 of the orifice 15 when the valve cover 16 is being installed.

During operation of the tower 10, liquid is directed into the top of the tower 10 and is caused to flow from tray deck 14-to-tray deck 14 in a zigzag manner and across each tray deck 14. At the same time, vapor is passed upwardly from the bottom of the tower 10 through each orifice 15 in each tray deck 14 and laterally through the two gaps formed by the valve cover 16 over each orifice 15.

The valve cover 16 serves two purposes. First, the valve cover 16 keeps liquid from going down an orifice 15 at low vapor rates. This helps to extend the operating range of the tray 11. Second, the valve cover 16 forces the vapor to disperse laterally through the liquid rather than just blowing straight up through the liquid. This encourages mixing of the vapor and liquid and also discourages entrainment of liquid on the tray deck 14 straight up to the deck 14 above.

As noted above, the central portion 19 of the valve cover 16 may be of a greater width than the central section 17 of the orifice 15. In this case, the valve cover overlap could permit the use of greater tray deck open area which would tend to increase tray vapor capacity. Also, the central portion 19 of the valve cover 16 may be of a lesser width than the central section 17 of the orifice 15 in different pressure systems where such would be of advantage.

The valve cover 16 that can be installed from either the top or bottom of a tray deck 14. This advantage differentiates the valve cover 16 from other valve covers.

Further, the valve cover 16 has the ability to flex upon installation rather than requiring a deformation and/or some sort of crimping to cause the tabs 21 to hold the valve cover 16 in place. In this respect, the valve cover 16 can be placed on an orifice 15 and then popped into place.

Referring to FIGS. 6 and 7, wherein like reference characters indicate like parts as above, the means to prevent lifting of the valve cover 24 from the tray deck 14 is in the form of a projection and slot arrangement. In this embodiment, a tray deck 14 may be made with an orifice 22 of rectangular shape with a projection 23 at each of the smaller ends that projects into the orifice 22 and the valve cover 24 has an elongated central portion 25 and a pair of sloped portions 26, each of which has a slot 27 of a size to receive a projection 23.

In this embodiment, the valve cover 24 may be of the same width as the orifice 22. In this case, the projections 23 of the orifice engage within the slots 27 of the valve cover 24 in order to hold the valve 24 in place.

Where use is not made of the slots 27 and projections 23, in order to prevent the valve cover 24 from falling through the orifice 22, the central portion 25 of the valve cover 24 is made wider than the orifice 22. The sloped portions 26 serve to prevent the valve cover 24 from being blown upwardly through the orifice 22 when in place. Alternatively, an upper section of each sloped portion 20 may also be made wider than the orifice 22 to rest on the tray 11 with a lower section of each sloped portion 20 being of lesser width than the orifice 22 to pass through and under the tray 11.

Referring to FIG. 8, wherein like reference characters indicate like parts as above, the valve cover 24' may have a pair of slots 27 formed in each of the sloped portions 26 for engaging with a like number of projections (not shown) in a corresponding orifice of each tray. The cover 24' is shaped so as to be used with an orifice 15 (not shown) of rectangular shape. To this end, the width a of the cover 24' is made equal to the width of the rectangular orifice and the distance b between the pairs of slots 27 is made equal to the length of the orifice.

Referring to FIGS. 9 and 10, wherein like reference characters indicate like parts as above, the means to prevent lifting of the valve cover 24 from the tray deck 14 may be in the form of one or more barbs or projections to engage the tray deck 14. As shown, the valve cover 28 may have a pair of spaced apart outwardly extending barbs 29 formed on each sloped portion 26 for engaging the tray deck 14 from above and below via a snap-fit at each respective end of an orifice.

Referring to FIG. 11, wherein like reference characters indicate like parts as above, the valve cover 16 as described in FIGS. 1 to 3, may have an outwardly extending barb 29 formed on each tab 21 for engaging under the tray 11 when in place in order to prevent the valve cover 16 from lifting out of the tray 11. As above, each sloped portion 20 is wider than the central section 17 of the orifice 15.

Referring to FIG. 12, the valve cover 30 may be made with a central portion 31 and a pair of sloped portions 32, as above, with each sloped portion 32 being digitated at the bottom end so as to form a plurality of tabs 33. In this embodiment, the orifice (not shown) is formed with a plurality of end sections corresponding to the number of tabs 33 on the valve cover 30. As above, each end section is made of a width to allow a tab 33 to pass therethrough and to allow the tab 33 to engage the underside of a tray.

In this embodiment, the valve cover 30 rests on the top of the tray when in place and the tabs 33 serve to prevent the valve cover 30 from lifting out of the orifice of the tray.

Referring to FIGS. 13 and 14, the valve cover 34 has a central portion 19 from which a pair of sloped portions 20 extend and each sloped portion 20 has a tab 35 that extends perpendicularly of the tray 11. In order to prevent the valve cover 34 from being blown upwardly through an orifice in the tray deck 14, each tab 35 is provided with an outwardly extending barb 29 for engaging under the tray 11 when in place as indicated in FIG. 14. Also, each sloped portion 20 may be narrowed to the width of the tabs 35 to pass through the tray deck 14 but in this case a second barb (not shown) would be used in the manner of the pair of barbs 29 of the FIG. 9 embodiment.

Referring to FIGS. 15 and 16, wherein like reference characters indicate like parts as above, the valve cover 36 cooperates with an orifice of rectangular shape of the same width. In this embodiment, the valve cover 36 has a central portion 19 disposed over a central section of the orifice and a pair of resilient sloped portions 20 that extend from opposite ends of the central portion 19 through the orifice and beyond as shown in FIG. 16. The sloped portions 20 serve to prevent the valve cover 36 from lifting out of the orifice. In order to prevent the valve cover 36 from falling through an orifice, each sloped portion 20 has at least one integral tab 37 formed in the end thereof that is bent outwardly in order to engage the top of the tray 11 as indicated in FIG. 16.

The invention thus provides a valve cover that can be easily installed and a tray with a reduction in labor cost.

The invention further provides several embodiments of a valve cover that allows for fast installation techniques and the ability to install from either side of a tray. These features, in turn serve to reduce the costs of installation thereby making the valve more cost effective to use than others.

One of the big disadvantages of trays with separate valves is the labor cost to install each of the valves. Faster installation methods and the ability to install from either side will help to reduce these costs, making the valve more cost effective to use than others.

What is claimed is:

1. A contact tray for a mass transfer column comprising
a tray deck for receiving a flow of liquid thereon, said tray deck having a plurality of orifices for passage of an ascending vapor therethrough; and
a plurality of valve covers, each said valve cover being mounted in a respective one of said orifices and having a central portion disposed in spaced relation to said tray deck and over a respective orifice and a pair of sloped portions extending laterally outwardly from opposite ends of said central portion and extending through a respective orifice.

2. A contact tray as set forth in claim 1 further comprising means for engaging a respective valve cover with said tray deck to prevent lifting of said respective valve cover from said tray.

3. A contact tray as set forth in claim 2 wherein said means includes at least one tab extending from each respective sloped portion beyond said respective orifice to abut an underside of said tray deck adjacent said respective orifice.

4. A contact tray as set forth in claim 3 wherein each said tab extends perpendicularly of said tray deck and has an outwardly extending barb for engaging an underside of said tray deck.

5. A contact tray as set forth in claim 2 wherein said means includes at least one protuberance on said tray projecting into a respective orifice and a slot in at least one of said sloped portions of a respective valve cover for receiving said protuberance.

6. A contact tray as set forth in claim 2 wherein said means includes a pair of spaced apart barbs on each said sloped portion for engaging said tray deck from opposite sides.

7. A contact tray for a mass transfer column comprising
a tray deck for receiving a flow of liquid thereon, said tray deck having a plurality of orifices for passage of an ascending vapor therethrough, each said orifice having a central section and at least a pair of end sections of smaller width than said central section extending from opposite ends of said central section; and
a plurality of valve covers, each said valve cover being mounted in a respective one of said orifices and having a central portion disposed over said central section of a respective orifice, a pair of sloped portions extending from opposite ends of said central portion and resting on said tray deck and at least one tab extending from each said sloped portion, each said tab extending from a respective one of said sloped portions through a respective end section of a respective orifice in said tray deck and under said tray deck.

8. A contact tray as set forth in claim 7 wherein a respective tab extending from one of said pair of sloped portions is of a different width from a respective tab extending from the other of said pair of sloped portions.

9. A contact tray as set forth in claim 7 wherein said central section of each respective orifice is of trapezoidal shape and each respective valve cover is of multi-chordal shape with a central section of trapezoidal shape.

10. A contact tray as set forth in claim 9 wherein each central portion of a respective valve cover is of greater width than a respective central section of each respective orifice throughout the longitudinal length thereof.

11. A contact tray as set forth in claim 7 wherein each respective valve cover is of multi-chordal shape with said sloped portion of each respective valve cover forming an obtuse angle with said central portion of said respective valve cover.

12. A contact tray as set forth in claim 11 wherein each tab is coplanar with an adjacent sloped portion.

13. A contact tray as set forth in claim 7 wherein said valve cover is of a smaller thickness than said tray deck.

14. A contact tray as set forth in claim 7 wherein said valve cover is of 10 to 16 gauge.

15. A contact tray as set forth in claim 7 wherein said tray deck has a thickness of 3.5 mm and each said valve cover has a thickness of 3.5 mm.

16. A contact tray as set forth in claim 7 wherein said central section of each said valve cover is of smaller width than said central section of a respective orifice for upward passage therethrough upon installation of a respective valve cover in a respective orifice.

17. A contact tray for a mass transfer column comprising
a tray deck for receiving a flow of liquid thereon, said tray deck having at least one orifice for passage of an ascending vapor therethrough, said orifice having a central section and at least a pair of end sections of smaller width than said central section extending from opposite ends of said central section; and
a valve cover mounted in said orifice and having a central portion disposed in spaced relation to said tray deck and over said central section of said orifice, a pair of sloped portions extending from opposite ends of said central portion and resting on said tray deck and at least a pair of tabs, each said tab extending from a respective one of said sloped portions through a respective end section of said orifice in said tray deck and under said tray deck.

18. A contact tray as set forth in claim 17 wherein each tab of said pair of tabs has a different width from the other of said pair of tabs.

19. A contact tray as set forth in claim 17 wherein said central section of said orifice is of trapezoidal shape and said central portion of said valve cover is of trapezoidal shape.

20. In combination, a tower disposed on a vertical axis; and a plurality of horizontal contact trays disposed in spaced vertical relation within said tower, each said contact tray including a tray deck for receiving a flow of liquid thereon, said tray deck having at least one orifice for passage of an ascending vapor therethrough, said orifice having a central section and at least a pair of end sections of smaller width than said central section extending from opposite ends of said central section; and a valve cover mounted in said orifice and having a central portion disposed in spaced relation to said tray deck and over said central section of said orifice, a pair of sloped portions extending from opposite ends of said central portion and resting on said tray deck and at least a pair of tabs, each said tab extending from a respective one of said sloped portions through a respective end section of said orifice in said tray deck and under said tray deck.

21. The combination as set forth in claim 20 further comprising a plurality of downcomers, each said downcomer communicating one side of a respective contact tray with one side of a contact tray therebelow to deliver liquid thereto.

* * * * *